(12) United States Patent
Kelley

(10) Patent No.: US 10,561,128 B2
(45) Date of Patent: Feb. 18, 2020

(54) METHOD OF MANUFACTURING A FISHING LURE

(71) Applicant: Paul S. Kelley, Vernon, CT (US)

(72) Inventor: Paul S. Kelley, Vernon, CT (US)

(*) Notice: Subject to any disclaimer, the term of this patent is extended or adjusted under 35 U.S.C. 154(b) by 429 days.

(21) Appl. No.: 15/390,728

(22) Filed: Dec. 27, 2016

(65) Prior Publication Data
US 2018/0177171 A1 Jun. 28, 2018

(51) Int. Cl.
| | | |
|---|---|---|
| *B29C 45/14* | (2006.01) | |
| *A01K 85/16* | (2006.01) | |
| *A01K 91/04* | (2006.01) | |
| *B29C 45/00* | (2006.01) | |
| *B29L 31/00* | (2006.01) | |

(52) U.S. Cl.
CPC .............. *A01K 85/16* (2013.01); *A01K 91/04* (2013.01); *B29C 45/0062* (2013.01); *B29C 45/14311* (2013.01); *B29C 2045/0063* (2013.01); *B29L 2031/7002* (2013.01)

(58) Field of Classification Search
None
See application file for complete search history.

(56) References Cited

U.S. PATENT DOCUMENTS

| | | | | |
|---|---|---|---|---|
| 2,666,954 A | * | 1/1954 | Potter ................. | B29C 44/1285 15/167.1 |
| 2,680,926 A | * | 6/1954 | Janis ..................... | A01K 85/16 43/42.5 |
| 3,325,939 A | * | 6/1967 | Ryan ........................ | A63H 3/04 446/374 |
| 3,344,550 A | * | 10/1967 | Peters .................... | A01K 85/16 43/42.11 |
| 3,415,924 A | * | 12/1968 | Girardi .................. | B29D 29/06 264/229 |
| 3,488,877 A | * | 1/1970 | Carabasse .............. | A01K 85/10 43/42.09 |
| 3,537,207 A | * | 11/1970 | McClellan ............. | A01K 85/00 43/42.15 |
| 3,970,733 A | * | 7/1976 | Kraft ...................... | B29C 70/58 264/135 |
| 4,571,209 A | * | 2/1986 | Manning ................. | A63H 9/00 264/138 |
| 5,182,875 A | * | 2/1993 | Righetti ................ | A01K 85/18 43/42.09 |
| 5,257,873 A | * | 11/1993 | Abbat ..................... | A63H 3/46 403/52 |
| 5,299,378 A | * | 4/1994 | Ballard .................. | A01K 85/00 43/42.06 |
| 5,630,745 A | * | 5/1997 | Yeh .......................... | A63H 3/04 446/374 |

(Continued)

*Primary Examiner* — Edmund H Lee
(74) *Attorney, Agent, or Firm* — Robert S. Smith

(57) ABSTRACT

A method for insert molding a product which includes providing an insert having a plurality of elements that are loosely linked together; applying a bonding agent to at least two of the elements to temporarily link those to elements in substantially locked mutually fixed relationship; supporting the at least two elements within a mold; injecting molding material within the mold whereby a molded part surrounding the at least two elements is formed; and flexing the molded part to substantially unlock the elements disposed in substantially locked mutually fixed relationship.

5 Claims, 3 Drawing Sheets

(56) References Cited

U.S. PATENT DOCUMENTS

| | | | | |
|---|---|---|---|---|
| 5,756,029 A * | 5/1998 | Nakamichi | ............ | B29C 45/16 264/161 |
| 5,989,658 A * | 11/1999 | Miura | ............ | A63H 3/46 264/241 |
| 6,537,130 B1 * | 3/2003 | Lee | ............ | A63H 3/04 403/122 |
| 6,800,016 B2 * | 10/2004 | Wittenberg | ............ | A63H 9/00 446/373 |
| 6,941,696 B2 * | 9/2005 | Kato | ............ | A01K 85/16 43/42.24 |
| 7,694,453 B1 * | 4/2010 | Arrico | ............ | A01K 85/02 43/42.06 |
| 8,991,095 B2 * | 3/2015 | Roberts | ............ | A01K 85/00 43/42.37 |

* cited by examiner

METHOD OF MANUFACTURING A FISHING LURE

TECHNICAL FIELD

The present invention is generally directed to manufacturing methods and sporting goods. More particularly, the present invention is directed to insert molding and insert molding of fishing lures.

BACKGROUND OF THE INVENTION

The present invention relates to fishing lures. Some fishing lures are manufactured with rigid bodies to which fishhooks are attached. However, it is highly desirable to manufacture a fishing lure having a flexible body. Because such flexible bodies do not have sufficient tensile strength to, for example, attach a fishing line to one axial extremity and a hook to the other end of the lure. It is necessary to provide some internal structure within the fishing lure that transfers forces, for example, when a fish is hooked by a hook attached to the tail end of the fishing lure. Because of the need for flexibility of the fishing lure it is essential that the internal structure also have flexibility. The flexibility facilitates a much more useful fishing lure because the flexible body produces better animation that the animation possible with a rigid body. Accordingly, the fishing lure produced in accordance with the present invention it is more lifelike and therefore more useful in catching fish.

From the above, it is therefore seen that there exists a need in the art to overcome the deficiencies and limitations described herein and above.

SUMMARY OF THE INVENTION

The shortcomings of the prior art are overcome and additional advantages are provided through a molding process that secures a flexible linkage within a mold before and during injection molding of the flexible body around the flexible linkage.

A method for insert molding a product which includes providing an insert having a plurality of elements that are loosely linked together; applying a bonding agent to at least two of the elements to temporarily link those to elements in substantially locked mutually fixed relationship; supporting the at least two elements within a mold; injecting molding material within the mold whereby a molded part surrounding the at least two elements is formed; and flexing the molded part to substantially unlock the elements disposed in substantially locked mutually fixed relationship.

In some embodiments of the method the bonding agent is an ultraviolet cured bonding agent. The step of providing elements that are loosely linked together may include providing a swivel and a wire. In some embodiments of the method the product may be a fishing lure. The method may include the step of clamping at least a part of the insert having a plurality of elements intermediate opposing halves of a mold.

The method may also include providing a wire extending intermediate opposing halves of a mold to support the plurality of elements that are loosely linked together.

Additional features and advantages are realized through the techniques of the present invention. Other embodiments and aspects of the invention are described in detail herein and are considered a part of the claimed invention.

The recitation herein of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

As described above it is desirable to produce a fishing lure that is flexible with a linkage assembly embedded within the fishing lure which is flexible so that it does not interfere with the flexibility of the fishing lure while concurrently providing transfer of physical forces between a connection and associated fishing line and hooks extending from the body fishing lure. Inherently the method in accordance with the present invention requires an insert molding technique that is different than traditional insert molding. It is known to use wires to stabilize the position of an insert within an injection molding mold. For many applications, this may be sufficient, however, if the part to be inserted within the mold is not sufficiently rigid throughout the physical extent thereof it becomes very difficult to position the insert in the mold. More specifically, a linkage such as that shown in FIG. 1 and many other similar linkages cannot easily be supported with a single wire ordinarily. This problem is not unique to the specific linkage shown in FIG. 1. It applies to all such linkages and all such objects that are inherently very flexible intended to be insert molded within injection molded product. Commonly, such linkages may multiple parts that are loosely connected together.

The present invention employs a technique to temporarily locks the loosely connected parts of such linkages together followed by a traditional insert injection molding process. Thereafter, flexure of the molded product unlocks the parts of the linkage so that all of the original flexibility of the linkage returns. Accordingly, the insert is properly aligned within the molded product and both the molded product and the linkage have full flexibility and optimum functionality.

In a preferred form of the method in accordance with the present invention the loosely connected parts of the linkage are secured together by ultraviolet light setting adhesive such as Lazer Bond marketed by Telebrands Corp. having a facility 79 Two Bridges Road; Fairfield, N.J. 07004. The quantity of the material will vary depending on the nature of the linkage being locked together. Advantageously, the locking step can typically be completed in approximately three seconds. Thus, the use of such a product facilitates a rapid, when I will source repetitive manufacturing process. Although the ultraviolet light activated bonding agent is preferred other embodiments of the present method invention may utilize alternative bonding agents.

Figure 1:
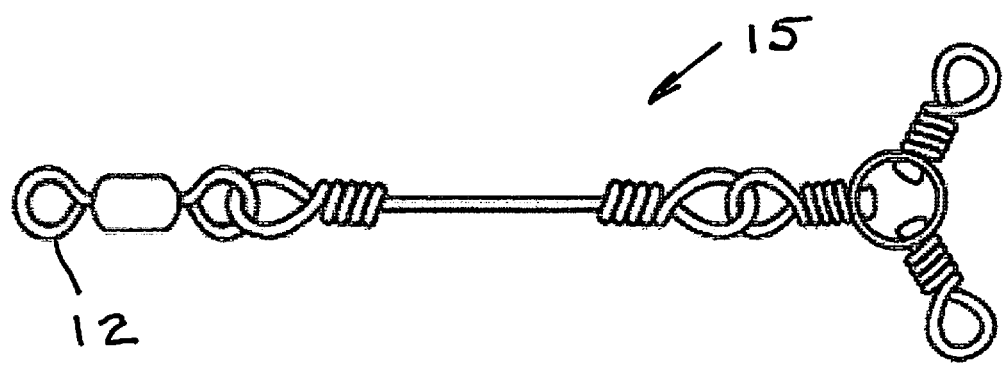
FIG. 1. is a plan view of a representative linkage of swivels and a rectilinear link, that desirably positioned within a flexible body.
Figure 2:
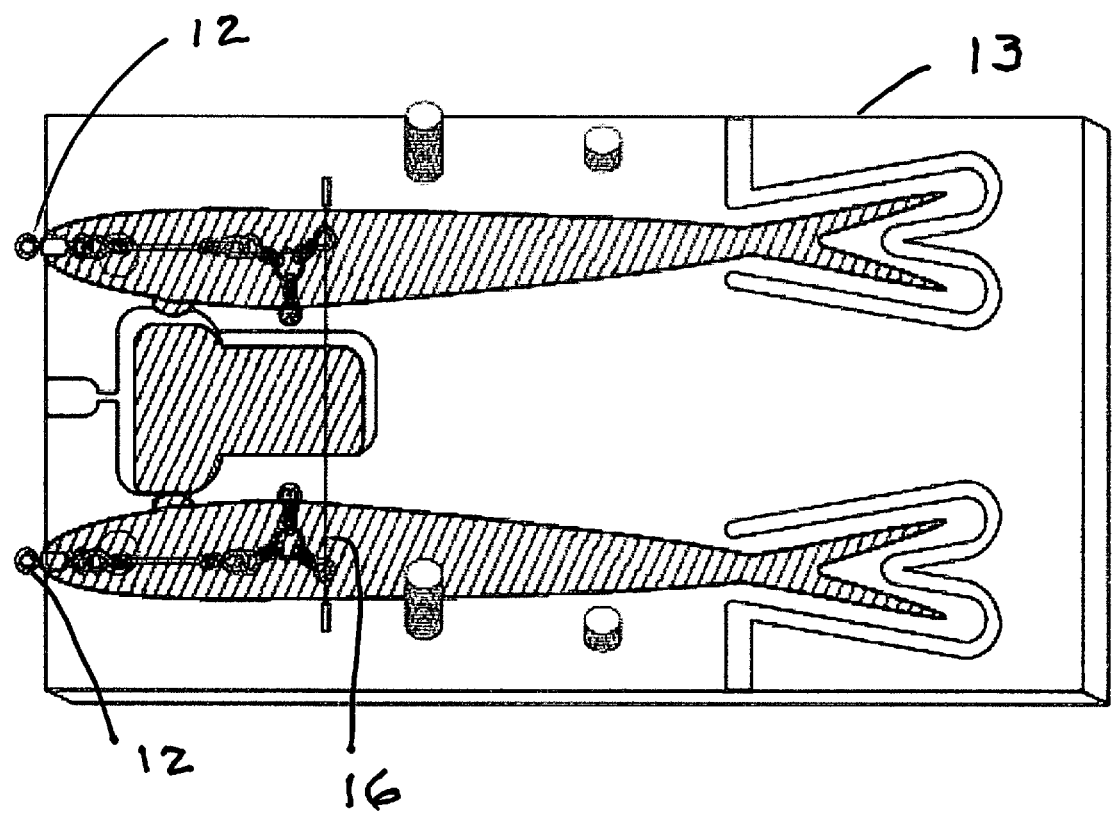
FIG. 2 is a plan view of one half of a mold illustrating two cavities four simultaneously molding two fishing lures with a linkage such as the linkage shown in FIG. 1 centered within the respective bodies of the two fishing lures.
Figure 3:
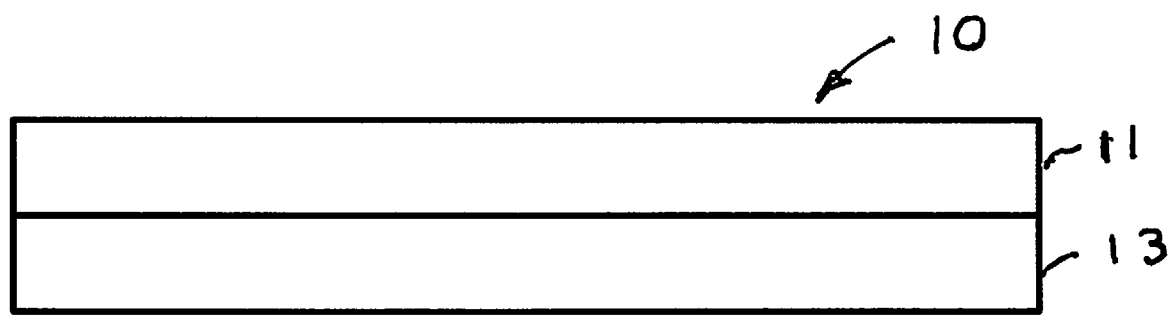
FIG. 3 is a partially schematic side view of two halves of a complete mold. More specifically, one half will be understood to be the structure illustrated in FIG. 2 and the other half will be understood to be substantially a mirror image of the structure shown in FIG. 2

The mold 10 shown in FIG. 3 includes a first half 11 and a second half 13. A more detailed view of the second half appears in FIG. 2. The linkage 15 such as the linkage shown in FIG. 1 is first temporarily locked and then positioned within the mold as shown in FIG. 2. When the locked linkage 15 is positioned within the mold 10 intermediate the first half 11 and the second half 13 the locked linkage 15 is secured by the clamping action of the first half 11 and the second half 13 proximity to the fishing line connector 12 in addition to a wire 16 disposed intermediate the first half 11 and the second half 13 of the mold 10. The wire 16 engages the other extremity of the linkage 15. In one embodiment of the method in accordance with the present invention the wire 16 is a 0.0130" diameter stainless steel wire. Accordingly, the linkage 15 is substantially disposed in coaxial relationship with the fishing lure. More specifically, the linkage 15 is prevented from drooping in a manner that would result in the linkage 15 penetrating or even being close to the outer surface of the the fishing lure.

Thereafter, flexure of the final product will inherently unlock the linkage 15. Accordingly, the final product has the linkage 15 properly aligned and the final product has flexibility and thus maximum functionality.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A method for insert molding a fishing lure which comprises sequentially:
   providing an insert having a plurality of elements that are loosely linked together;
   applying a bonding agent to at least two of the elements to temporarily link those two elements in substantially locked mutually fixed relationship;
   supporting the at least two elements within a mold dimensioned and configured to form a fishing lure;
   injecting flexible molding material within the mold whereby a flexible fishing lure surrounding the at least two elements is formed; and
   flexing the flexible fishing lure to substantially unlock the two elements disposed in substantially locked mutually fixed relationship within the flexible fishing lure whereby the combination of the two elements within the flexible fishing lure is flexible.

2. The method as described in claim 1 wherein the bonding agent is an ultraviolet cured bonding agent.

3. The method as described in claim 1 wherein the at least two elements are respectively a swivel and a wire.

4. The method as described in claim 1 wherein at least a part of the insert having a plurality of elements that are loosely linked together has at least a part thereof intermediate discrete opposing halves of a mold.

5. The method as described in claim 1 wherein at least a part of the insert having a plurality of elements that are loosely linked together is supported by a wire extending across the interface of one discrete opposing halve of a mold.

* * * * *